UNITED STATES PATENT OFFICE.

SAMUEL G. MORRISON, OF WILLIAMSPORT, PENNSYLVANIA.

IMPROVEMENT IN COMPOSITIONS FOR ROOFS, PAVEMENTS, &c.

Specification forming part of Letters Patent No. 117,196, dated July 18, 1871.

*To all whom it may concern:*

Be it known that I, SAMUEL G. MORRISON, of the city of Williamsport, county of Lycoming and State of Pennsylvania, have invented a certain process for deodorizing, setting, or fixing gas or coal-tar, to be used in roofing, paving, and as a cement.

The nature of my invention consists in mixing an iron carbon with gas or coal-tar.

To prepare the mastic cement, take an iron carbon (commonly called black-band ore) free from silica or other foreign matter, grind or pulverize it as fine as possible; then mix the flour into the tar in such proportion as to make a cement of any desired consistence for the purpose intended.

I claim as my invention—

The use of iron carbon (black-band ore) pulverized, as a drier, when mixed with gas or coal-tar for cement, for the purposes aforesaid.

S. G. MORRISON.

Witnesses:
    HEPBURN MCCLURE,
    SAMUEL CRAWFORD.